Aug. 30, 1938.   J. D. STACY   2,128,857

CAPACITOR FOR POLYPHASE CIRCUITS

Filed March 3, 1938

Y-CONNECTED

Δ-CONNECTED

Inventor:
John D. Stacy,
by Harry E. Dunham
His Attorney.

Patented Aug. 30, 1938

2,128,857

UNITED STATES PATENT OFFICE 2,128,857

CAPACITOR FOR POLYPHASE CIRCUITS

John D. Stacy, Pittsfield, Mass., assignor to General Electric Company, a corporation of New York Application March 3, 1938, Serial No. 193,708

6 Claims. (Cl. 172—246)

My invention relates to polyphase alternating current power circuits having capacitors employed therewith for the purpose of improving the power factor and it has for its object the provision of an improved construction and connection arrangement of the capacitors so employed.

A construction and arrangement commonly employed heretofore for the improvement of power factor on three-phase circuits comprises three separate capacitors of like capacitance and kv-a rating each connected across one phase of the circuit. In the manufacture of capacitors adapted for power factor correction it has been found that the cost per unit of capacitance or kv-a rating of the capacitors decreases as the capacitance or rating thereof increases. I have taken advantage of this fact and in accordance with my invention I construct unit capacitors of larger size but I employ a fewer number thereof whereby the total amount of capacitance provided may remain the same as before. Each capacitor unit comprises two parts or sections of which one has substantially twice the capacitance of the other and I connect the capacitor units with the conductors of the three-phase circuit in such a way that the capacitances of the larger sections are supplied each to one phase of the circuit and the capacitances of the smaller sections are supplied jointly to the remaining phase, it being immaterial whether the three-phase circuit is a Y-connected or delta-connected circuit.

My invention will be better understood from the following description taken in connection with the accompanying drawing, and its scope will be pointed out in the appended claims.

Figure 1:
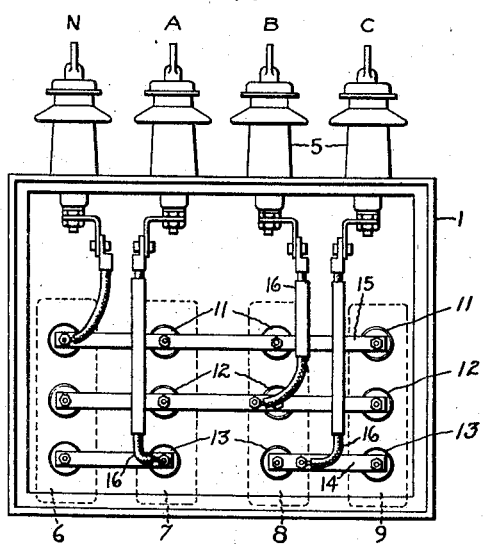
Figure 2:
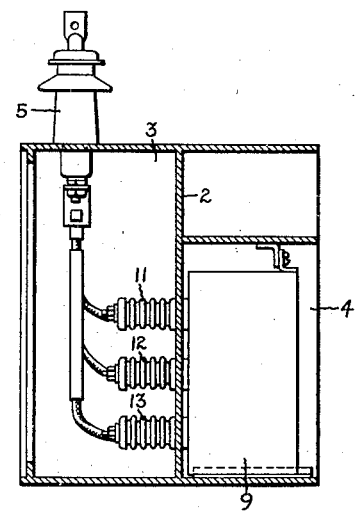
Figure 3:
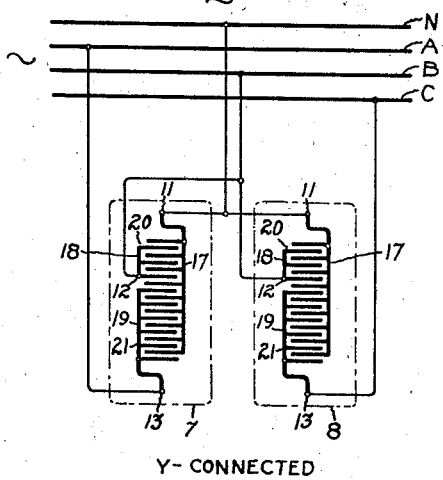
Figure 4:
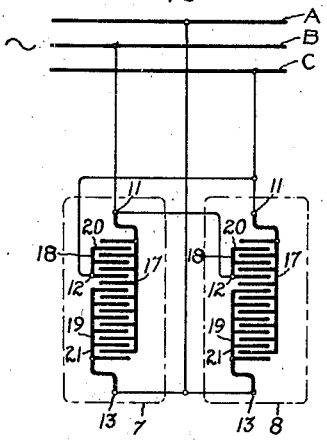

Referring to the drawing, Fig. 1 is a side view of a complete capacitor assembly illustrating one embodiment of my invention; Fig. 2 is a cross sectional view thereof; and Figs. 3 and 4 are circuit diagrams illustrating different connections of the capacitor units. The assembly as shown by Figs. 1 and 2 comprises the enclosing casing 1 having front and rear movable doors which doors are omitted from the illustrations. The partition 2 extending vertically across the casing forms the connecting chamber 3 on one side thereof and the capacitor chamber 4 on the other side. The main terminal bushings 5 extending through the upper wall of the casing provide means by which the capacitors may be connected to the line conductors of a polyphase circuit.

In the capacitor chamber 4 I have shown four capacitor units 6, 7, 8 and 9 all of which are of identical construction and each of which comprises two capacitor sections one having substantially twice the capacity of the other. Each capacitor unit is suitably enclosed in a casing provided with three terminal bushings 11, 12 and 13 of which the terminal 11 is common to the two sections thereof, being connected with one side of each, and the terminals 12 and 13 are connected with the remaining sides of the sections. The partition 2 is provided with suitable openings through which the terminal bushings 11, 12 and 13 of each capacitor unit project into the connecting chamber. In this chamber the terminal bushings of the several capacitor units are interconnected in the desired manner by means of straps such as shown at 14 and 15 and these straps or the terminal bushings themselves are connected in a desired manner with the inner ends of the main terminal bushings 5 by means of the flexible connections 16. It will be noted that in Fig. 1, I have shown four capacitor units of which the two outermost units 6 and 9 are connected in parallel with the adjacent units 7 and 8. Units 6 and 9 are employed for the sole purpose of providing twice the capacitance that might be obtained by the use of merely the two units 7 and 8. By suitably arranging the straps 14 and 15 and the several flexible connections 16 secured to the inner ends of the main terminal bushings 5, the capacitor units may be connected to provide an equal amount of capacitance in each of the three phases of a three-phase circuit, whether the circuit is a Y-connected or a delta-connected circuit.

Each capacitor unit may be formed in a manner well known in the capacitor art such, for example, as by winding up layers of metal foil and a dielectric into a number of rolls which being flattened are arranged side by side in the enclosing casing. Referring to Fig. 3 which shows the capacitor elements diagrammatically, alternate foils of all the rolls of a unit are connected together by the bus 17 which itself connects with the common terminal 11. The other alternate foils of a certain number of rolls are connected together by the bus 18 and with the terminal 12 and likewise the other alternate foils of the remaining rolls are connected together by the bus 19 and with the terminal 13. The capacitor unit thus comprises two sections designated 20 and 21 of which the section 20 is the group of rolls having foils joined together by the bus 18 and the section 21 is the group having foils joined together by the bus 19. The bus 17 thereby connects together a pole of section 20 and a pole of section 21. The grouping is such that the capacitance of the section 21 is substantially twice that of the section 20. If desired the groups constituting the two sections may be separated from each other by a suitable partition.

In Fig. 3, which shows the capacitor units 7 and 8 connected to the three-phase Y-connected circuit represented by the phase conductors A, B, C, and the neutral N, it will be seen that the connections are such that the two terminals 11 are connected together and with the neutral N of the circuit; the two terminals 12 are connected together and to the phase conductor B; and the two terminals 13 are connected one to the phase conductor A and the other to the phase conductor C.

As pointed out above, section 21 of the capacitor unit has substantially twice the capacitance of the section 20 thereof. Since the capacitor units 7 and 8 are of identical construction it will be seen that when the units are connected in the manner disclosed by Figs. 1 and 3 whereby they are adapted for improving the power factor of a three-phase Y-connected circuit the capacitance added to the A—N phase is equal to that added to the C—N phase and is also equal to the capacitance added to the B—N phase inasmuch as the two sections 20 are arranged in parallel with each other.

If the three-phase circuit is delta-connected then the strap and flexible connections of the capacitor units will be modified in accordance with the diagram comprising Fig. 4. In this case the common capacitor terminal 11 of each unit will be connected to the terminal 12 of the other unit and the two terminals 13 will be connected together. These two latter terminals will be connected to one phase conductor, for example, the A-phase conductor, and the two terminals 11 will be connected to the other two phase conductors B and C. With the units so connected to the phase conductors of the three-phase circuit, it will be seen again that the capacitance added to the A—B phase by the section 21 of the unit 7 will be equal to that added to the A—C phase by the section 21 of the unit 8 which capacitance will also be equal to that added to the B—C phase by the two sections 20 since they are arranged in parallel with each other.

By the above described apparatus it will be seen that I have provided a capacitor construction and arrangement for supplying a desired amount of capacitance to the several phases of a polyphase power circuit by the use of a smaller number of units of larger size than heretofore whereby important economies may be effected in the manufacture of the apparatus.

Another advantage of my invention is that two identical units or multiples of two are adapted to be employed to correct the power factor of either a delta-connected circuit or a Y-connected circuit provided of course that the voltage between the conductors of the former is approximately the same as that between each conductor and the neutral of the latter. By way of example, the same units are adapted for use either on a 2300 volt delta-connected circuit or on a 4000 volt Y-connected circuit.

What I claim as new and desire to secure by Letters Patent of the United States is:

1. In combination, a three-phase alternating current circuit, two similar capacitor units each having two sections, the capacitance of one section being materially greater than that of the other and means connecting said circuit with all of said sections for supplying approximately the same amount of capacitance to each phase of the circuit.

2. In combination, a three-phase alternating current circuit, two similar capacitor units each having two sections, one section having twice the capacitance of the other and means connecting said circuit with said sections for supplying an equal amount of capacitance to each phase of the circuit.

3. In combination, a three-phase alternating current circuit and means for supplying the same amount of capacitance to each phase thereof, said means comprising a plurality of like capacitor units each having two capacitor sections, the capacitance of one section being substantially twice that of the other, means connecting together a pole of one section with a pole of the other section of each unit and connecting means between the conductors of said circuit and the poles of said sections for supplying the larger capacitance of one unit to one phase of said circuit, the larger capacitance of another unit to another phase thereof and the smaller capacitances of said units in parallel to the third phase thereof.

4. In combination, a three-phase alternating current circuit and means for supplying the same amount of capacitance to each phase thereof, said means comprising a plurality of like capacitor units each having two capacitor sections, the capacitance of one being substantially twice that of the other, a casing enclosing the sections of each unit and having a terminal common to one pole of each of the sections therein and a separate terminal for each of the opposite poles of said sections and connecting means between said terminals and the conductors of said circuit for supplying the larger capacitances each to one of two phases of the circuit and the smaller capacitances in parallel to the third phase.

5. A capacitor assembly by which an equal amount of capacitance may be supplied to each phase of a three-phase circuit comprising a plurality of like capacitor units each including two capacitor sections, the capacitance of one being twice that of the other, means connecting a pole of one section of each unit with a pole of the other section of that unit, means connecting together the aforesaid means, and means connecting together the free poles of the sections of lower capacitance.

6. A capacitor assembly by which an equal amount of capacitance may be supplied to each phase of a three-phase circuit comprising a plurality of like capacitor units each including two capacitor sections, the capacitance of one being twice that of the other, means connecting a pole of one section of each unit with a pole of the other section of that unit, means connecting the aforesaid means of each unit with the free pole of the section of less capacitance of another unit and means connecting together the free poles of the sections of greater capacitance.

JOHN D. STACY.